United States Patent [19]

Veatch

[11] Patent Number: 5,414,462
[45] Date of Patent: May 9, 1995

[54] METHOD AND APPARATUS FOR GENERATING A COMPREHENSIVE SURVEY MAP

[76] Inventor: John W. Veatch, 2022 Upperlake Dr., Reston, Va. 22091

[21] Appl. No.: 16,242

[22] Filed: Feb. 11, 1993

[51] Int. Cl.⁶ .............................................. H04N 7/18
[52] U.S. Cl. ................................ 348/135; 348/144; 348/147
[58] Field of Search .................. 348/64, 135, 144, 147, 348/158, 211, 373, 376; H04N 7/18

[56] References Cited

U.S. PATENT DOCUMENTS

| | | | |
|---|---|---|---|
| 4,635,136 | 1/1987 | Ciampa | 348/96 |
| 5,166,789 | 11/1992 | Myrick | 348/144 |
| 5,200,793 | 4/1993 | Ulich | 348/31 |
| 5,247,356 | 9/1993 | Ciampa | 348/144 |
| 5,265,173 | 11/1993 | Griffin | 348/147 |
| 5,267,042 | 11/1993 | Tsuchiya | 348/144 |

Primary Examiner—Howard W. Britton
Attorney, Agent, or Firm—Parkhurst, Wendel & Rossi

[57] ABSTRACT

A method and apparatus for generating a comprehensive land survey map is provided in which an image base map of a geographical survey region and a legal description map for each land parcel or lot within the geographical survey region are stored in a geographic information system (GIS). A remote sensing device is utilized to collect precise position data at survey points located on, near or adjacent the parcel of interest. The precise position data generated by the remote device is supplied to the GIS, which uses the data to correlate and align the legal description map for the parcel of interest with a portion of the image base map to create a comprehensive survey map for the parcel.

13 Claims, 6 Drawing Sheets

METHOD AND APPARATUS FOR GENERATING A COMPREHENSIVE SURVEY MAP

FIELD OF THE INVENTION

The invention relates generally to the field of land surveying and map making. More specifically, the invention relates to a method and apparatus for generating a comprehensive land survey map that includes both image data and survey data.

BACKGROUND OF THE INVENTION

There is an ever increasing requirement for more precise and comprehensive land survey maps from title insurance companies, lending institutions and property buyers. Traditional land survey maps generated from conventional surveying and mapping techniques are very limited in both the amount of information provided and the method of presenting the information. For example, the typical land survey map provided for a particular piece or parcel of property is currently limited to illustrating the boundary lines of the property and the location of certain man-made and naturally occurring features located on the property. The boundary lines are usually identified with reference to certain measurements of latitude and longitude that are incomprehensible to the average property buyer. Thus, the buyer has a difficult time correlating the information provided on the survey map with the actual physical features of the land. In addition to the limited amount of information provided, the process of using conventional surveying instruments to locate natural and man-made features in order to generate a land survey map is a tedious and time consuming task that is subject to errors and omissions, thereby increasing the difficulty title insurance companies and lending institutions have in establishing insurance and lending risk potentials for a particular piece of property.

In view of the above, it is an object of the present invention to provide a method and apparatus for generating a comprehensive land survey map that includes detailed image data to illustrate the visible attributes of the property and survey data to illustrate the invisible attributes of the proper such as boundary lines, right-of-ways and easements. It is a further object of the invention to generate the comprehensive land survey map in the form of a digital database that can be readily accessed.

SUMMARY OF THE INVENTION

The invention provides a method and apparatus for generating a comprehensive land survey map in which an image base map of a geographical survey region and a legal description map for each land parcel or lot within the geographical survey region are stored in a geographic information system (GIS). A remote sensing device is utilized to collect precise position data at survey points located on or near the surface of the earth which are related to the parcel of interest. The precise position data generated by the remote device is supplied to the GIS, which uses the data to correlate and align the legal description map and/or metes and bounds of the parcel of interest with a corresponding portion of the image base map to create a comprehensive survey map for the parcel.

The image base map preferably includes digitized image data that has been corrected or rectified, based on the topography of the land, to reflect an accurate planimetric view of the property. The image data is obtained via aerial photography or digital imaging of the geographic survey region and the rectification of the image data is accomplished based on the known position and elevation of fixed ground reference points that can be identified in image data.

BRIEF DESCRIPTION OF THE DRAWINGS

With the above as background, reference should now be made to the following detailed description of the preferred embodiment of the accompanying drawings, wherein.

DETAILED DESCRIPTION OF THE PREFERRED EMBODIMENT

Figure 1:
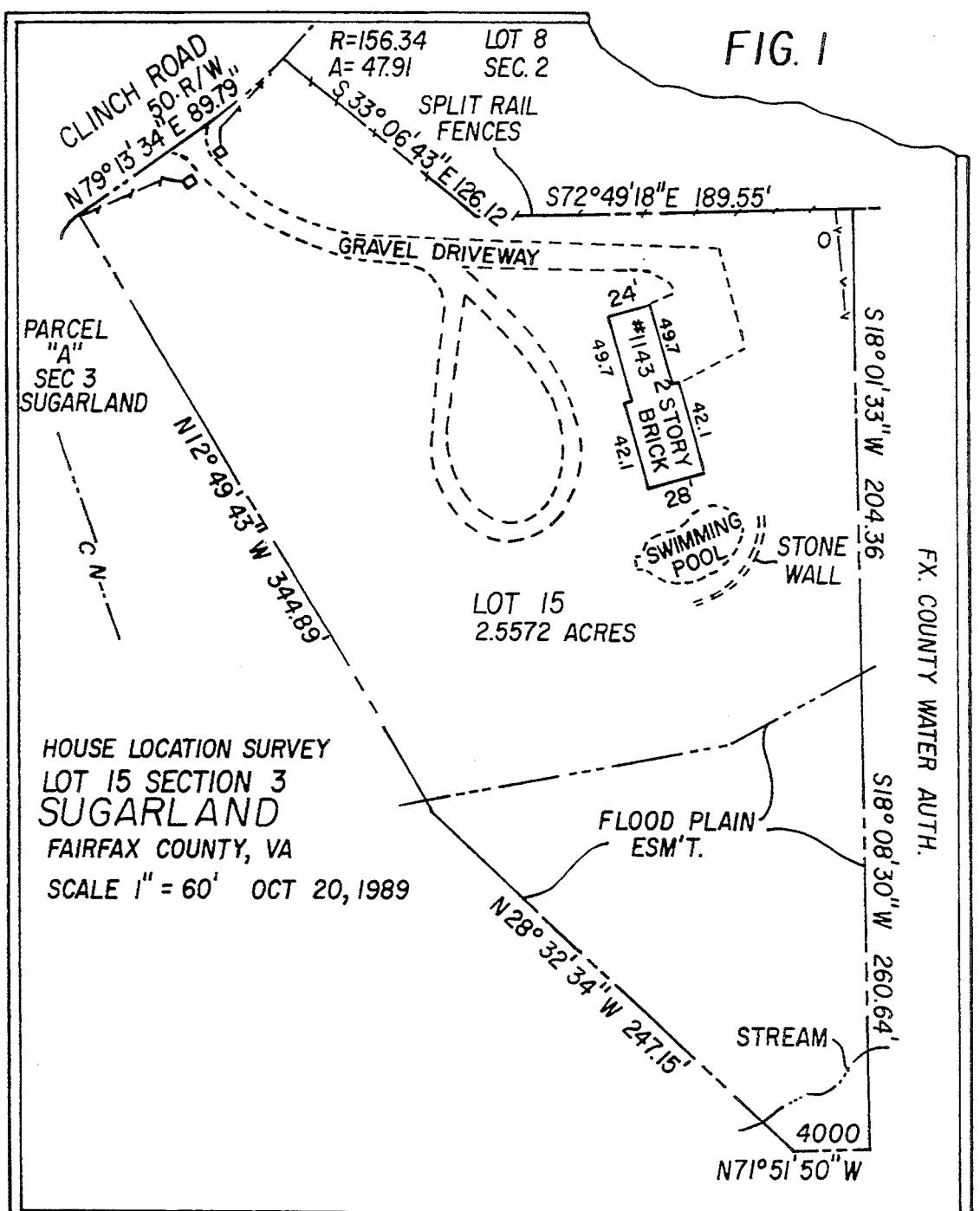
FIG. 1 is a conventional land survey map.

As was discussed above, conventional land survey maps do not provide a sufficient amount of information to enable a buyer of property to relate the property boundaries illustrated on the maps to the actual physical features of the land. A conventional survey map, for example of the type illustrated in FIG. 1, includes boundary lines that are identified by reference to the bearings and distances of the boundary lines or corner boundary points. The information contained on the map is generally incomprehensible to the average property buyer. More importantly, the information provided on the survey map may not be correct due to the human error-prone nature of conventional surveying processes, thereby increasing the difficulty title insurance companies and lending institutions have in establishing risk potentials for a particular parcel of property.

Figure 2:
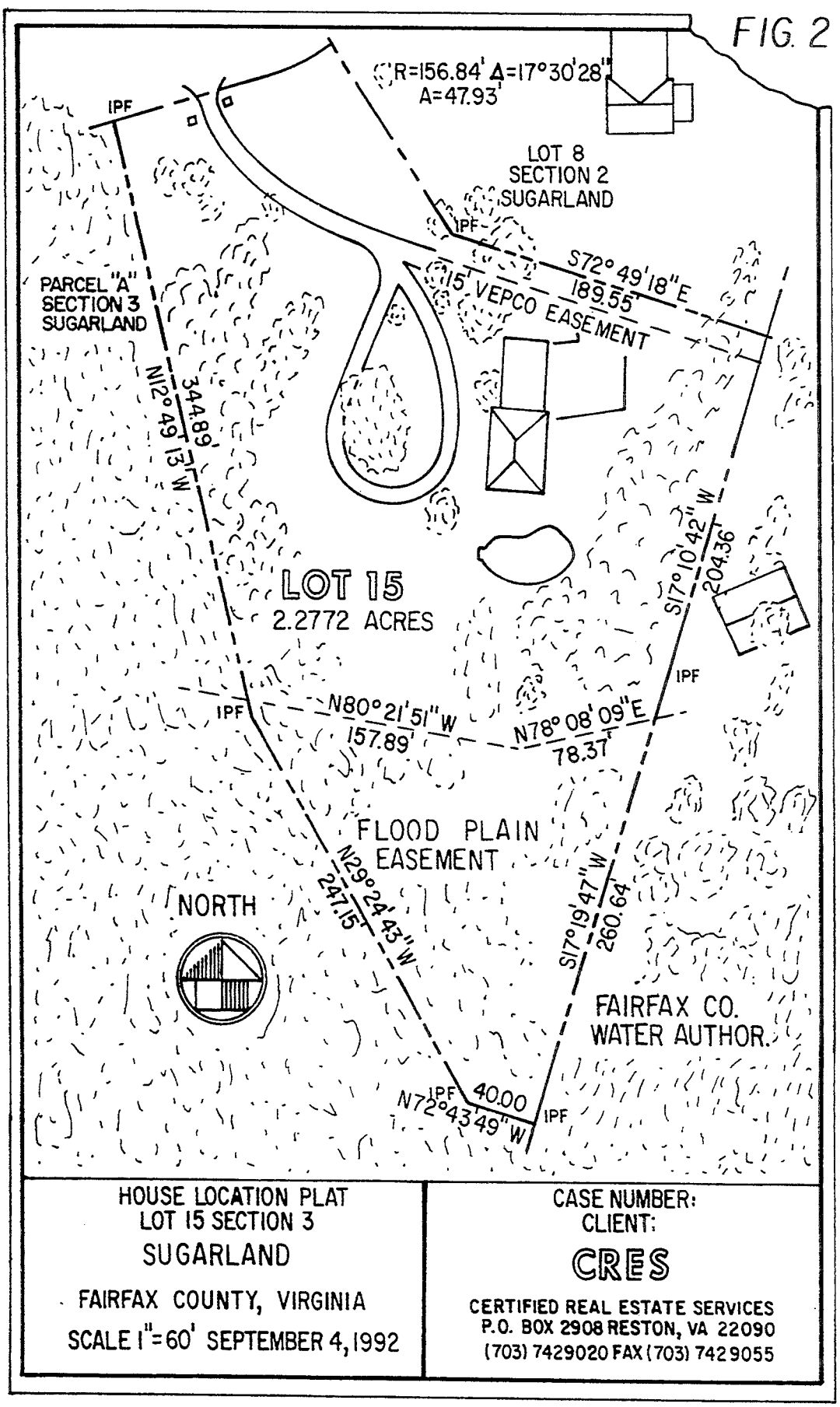
FIG. 2 is a land survey map of the type generated by the invention.

Referring now to FIG. 2, a land survey map of the type generated in accordance with the invention is shown including an actual reproduced image of the property surveyed in addition to survey data such as boundary lines and easements. The land survey map of FIG. 2 permits the rapid and accurate correlation of the boundary line and easement data to the actual physical properties of the land. In addition, as will be described in greater detail below, the overlaying of the boundary lines on the reproduced image of the property is accomplished through the utilization of data generated by a remote sensing device instead of conventional surveying techniques. Thus, the land survey map of FIG. 2 is free from the human errors or omissions inherent in land survey maps generated by conventional surveying techniques.

The process of implementing the invention will now be described with reference to the general flow diagram illustrated in FIG. 3. The first step of the process is to generate an image base map of the geographic survey region. The image base map preferably includes image data that has been corrected or rectified, based on the topography of the land, to reflect an accurate planimetric view of the property. The image data is obtained by taking aerial photographs of the geographic survey region and digitizing the photographic images to create digital image data. Alternatively, digital image techniques can be used to directly capture a digital image of the geographic survey region. In either case, it is necessary for the photographic images or digital images to include a plurality of fixed ground reference points of known latitude, longitude and elevation in order to permit the rectification of the digital image data. The fixed ground reference points can either be generated manually, for example by painting or locating visible indicators at points on the ground at which the latitude, longitude and elevation are determined by conventional surveying techniques, or by using an automated system (such as the GPS Aerial Survey Camera System available from Carl Zeiss Inc. of Thornwood, New York) which includes remote sensing devices to determine relative ground positions at known reference points within a photographic image.

The digital image data containing the ground reference points is supplied to the GIS, which uses the position and elevation data corresponding to the ground reference points to rectify the image data to create a digital orthophotograph of the geographic survey area that is stored in the GIS as the image base map. The image base map therefore includes all of the visible attributes of each parcel of property within the geographic survey region.

The next step of the process is to create a legal description map for each parcel or lot within the geographic survey region. Computer-aided drafting functions provided by the GIS are used to create the legal description map, i.e. a vector map, based on legal description data, including descriptions of all the invisible attributes of the parcel such as boundaries, easements, floodplain, etc., obtained from plats and/or deeds available from sources such as public land records. Additional text or graphic information, for example information identifying the company producing the survey map, can also be including within the legal description map if desired.

A comprehensive survey map for a specific parcel of property is then generated by using a remote sensing device to collect precise position data for at least three survey points related to the boundaries of the parcel of interest. In a preferred embodiment, the remote sensing device is a Global Positioning System (GPS) receiver that uses satellite transmitted radio signals to derive the latitude and longitude coordinates of the various survey points. The position data for the survey points is supplied to the GIS, which uses the data to overlay and orient the legal description map for the parcel of interest over a corresponding portion of the image base map, thereby creating a comprehensive survey map for the parcel of land. A physical or "hard" copy of the comprehensive survey map, as illustrated in FIG. 2, is printed by a printing unit.

Figure 3:
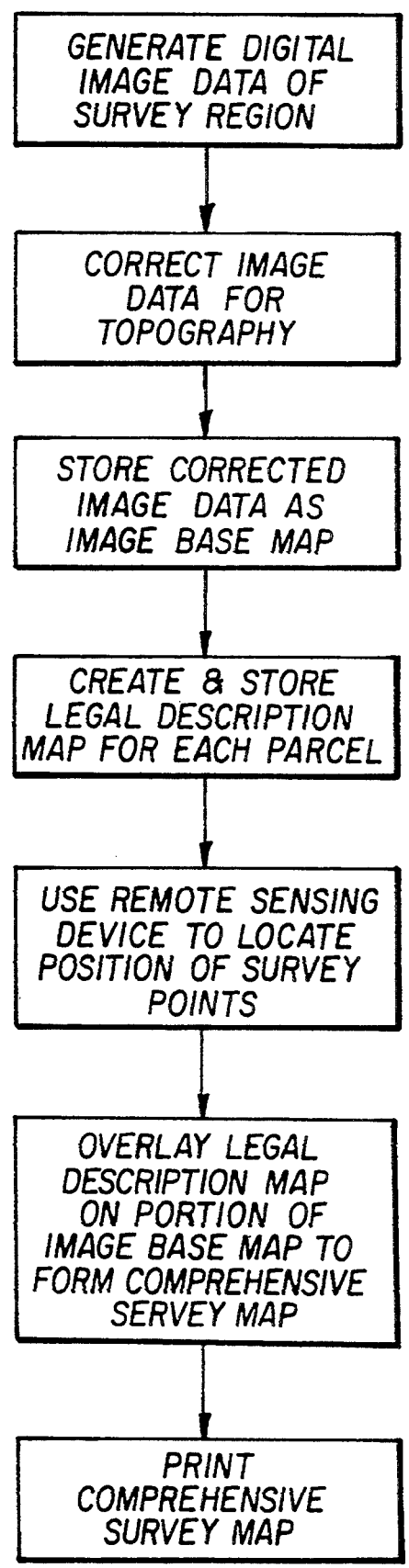
FIG. 3 is a basic flow diagram of a process for generating a comprehensive survey map in accordance with the invention.
Figure 4:
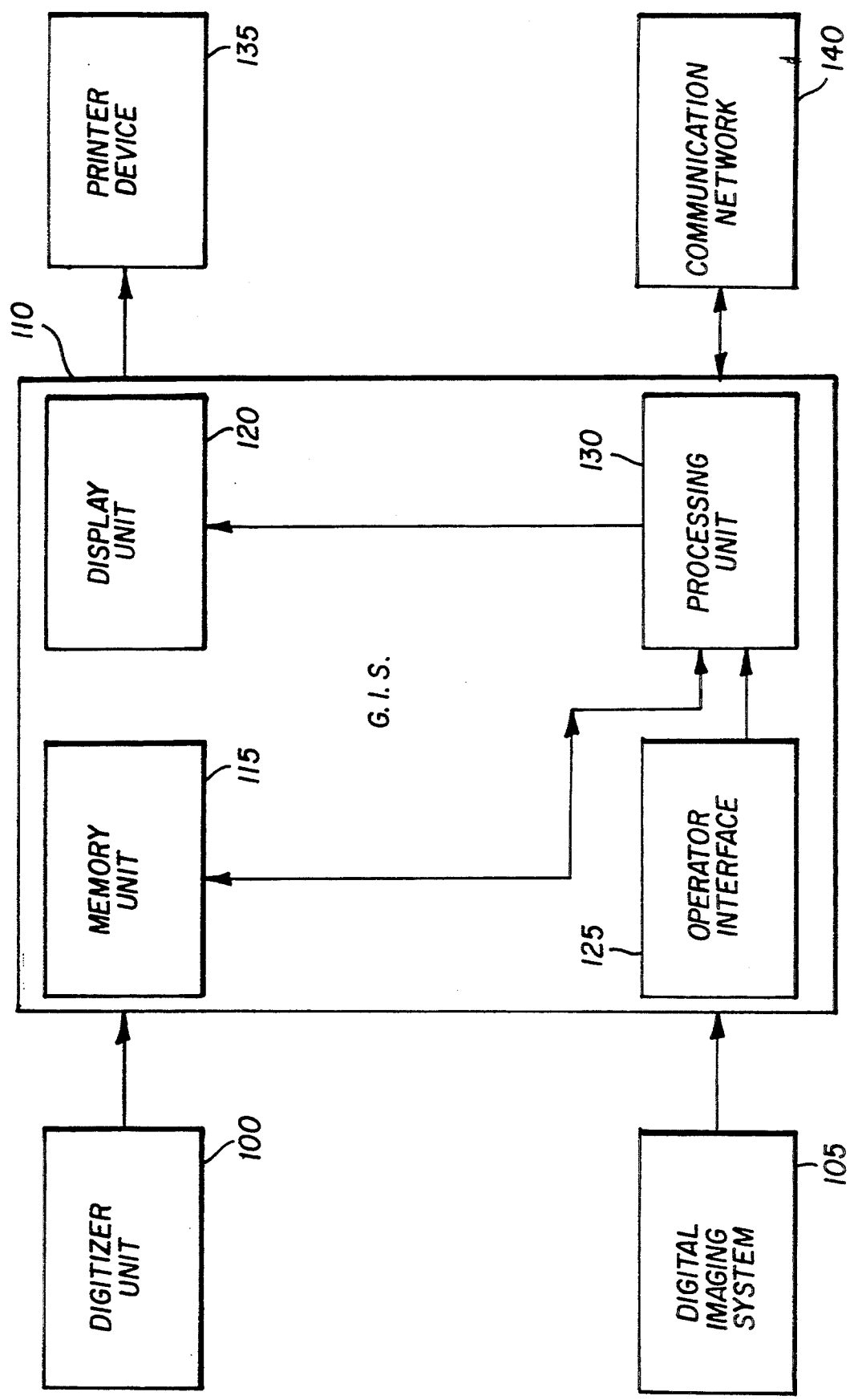
FIG. 4 is a basic block diagram of a system in accordance with the invention for implementing the process illustrated in FIG. 3.

FIG. 4 illustrates a system for performing the process outlined in FIG. 3. The system includes a digitizer unit 100, for digitizing aerial photographs of the geographic survey area, or alternatively a digital imaging system 105 for digitally imaging the geographic survey area. The output of the digitizer unit 100 or the digital imaging system 105 is supplied to a GIS 110. The GIS 110 includes a computer workstation with a memory unit 115, a display unit 120, an operator interface 125 and a processing unit 130 loaded with operating software.

Systems are currently available for processing geographic information of the type required by the present invention. For example, the Modular GIS Environment (MGE) system available from Intergraph Corporation of Huntsville, Alabama can be utilized for the GIS 110, although any desired type of computing system can be employed. The GIS 110 is coupled to an output printer device 135 that generates hard copies of the comprehensive survey map. In addition, the GIS processor 110 is preferably coupled to the a communications network 140 to permit direct transmission of the comprehensive survey map to locations remote from the GIS 110.

Figure 5:
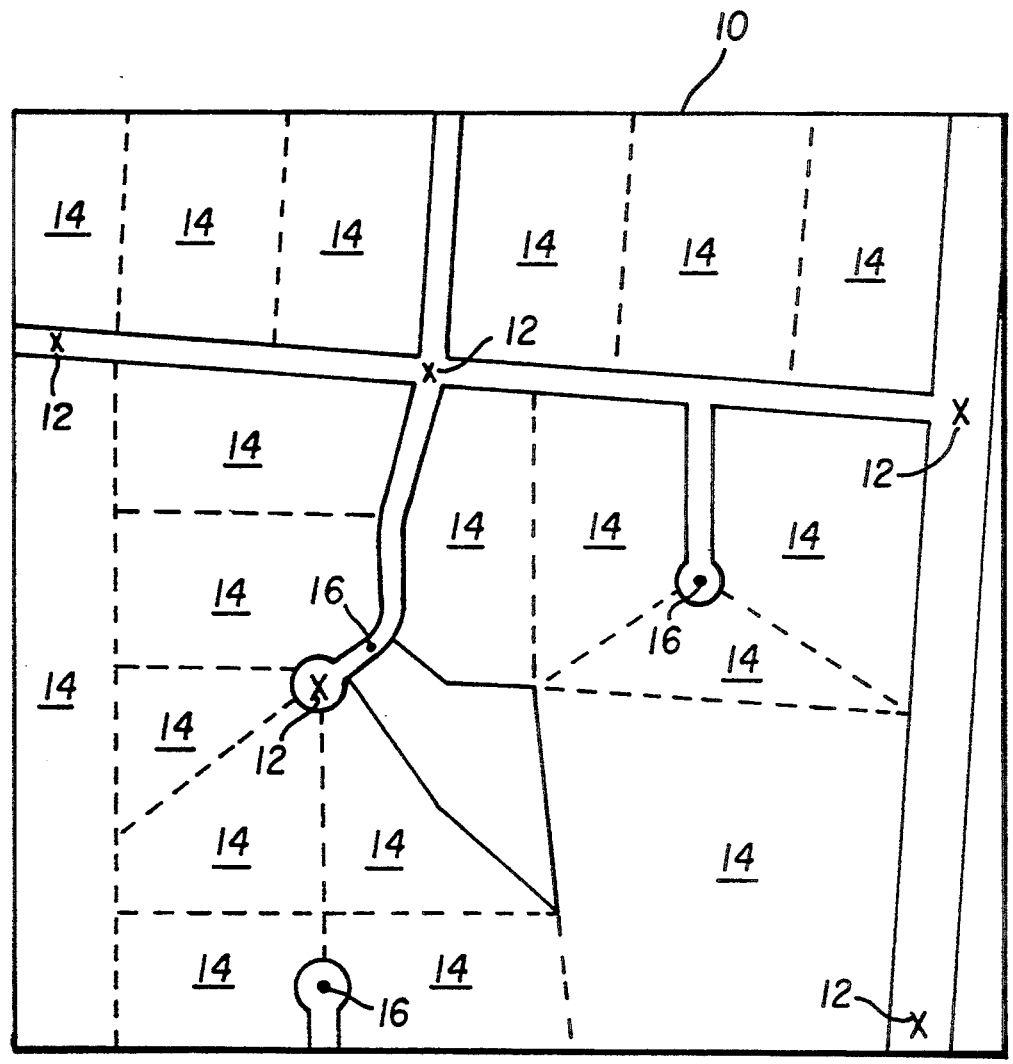
FIG. 5 is an example of a geographic survey region containing a plurality of individual land parcels or lots.
Figure 6:
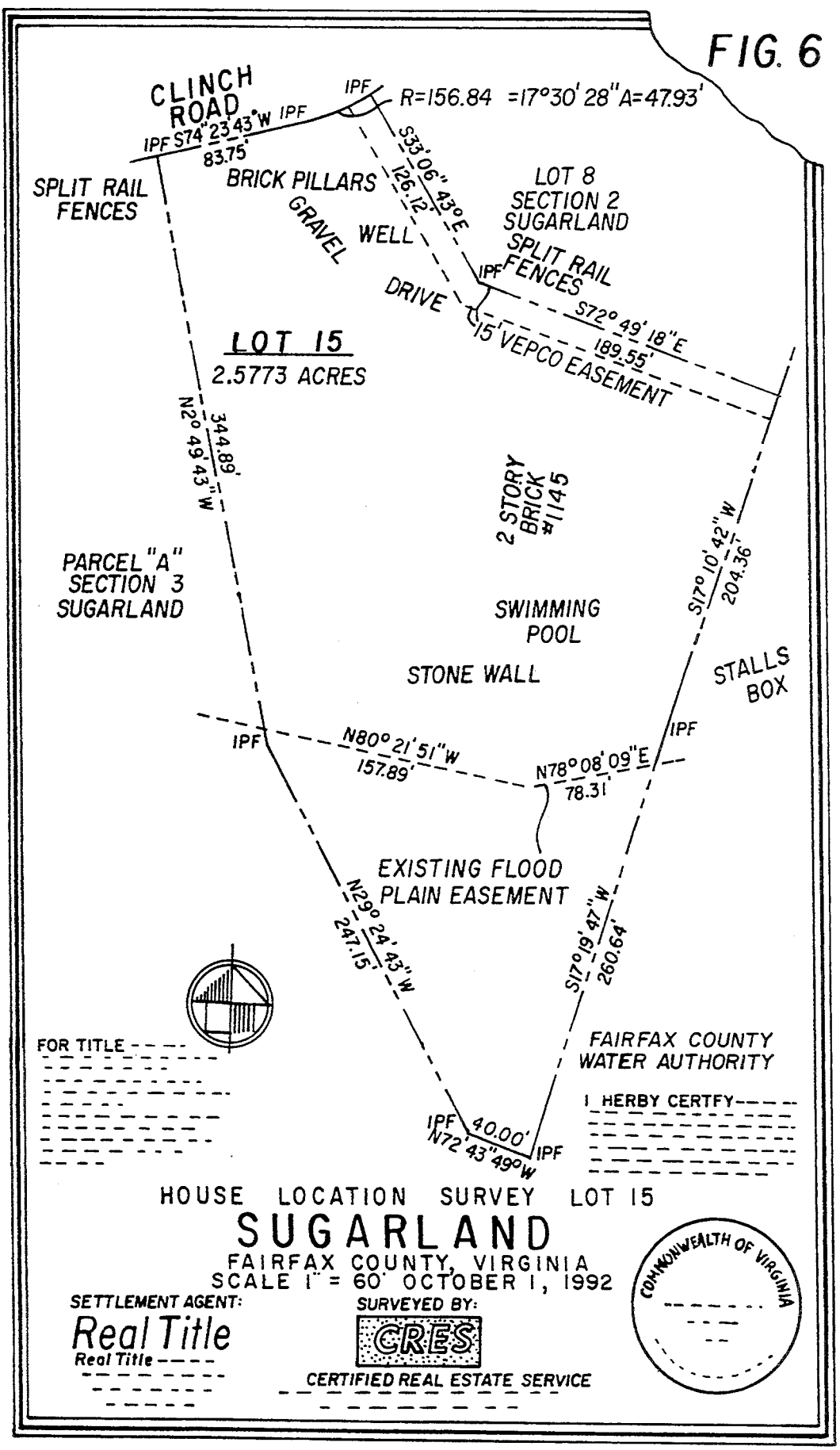
FIG. 6 is an example of a legal description map for one of the lots illustrated in FIG. 5.

The operation of the system illustrated in FIG. 4 will be discussed with reference to FIGS. 5–7. FIG. 5 illustrates a geographic survey region 10 having a number of fixed ground references points 12 located therein. It will be understood that the geographic survey region may be of any desired size, although the embodiment shown in FIG. 5 for purposes of illustrating the invention is limited to a small neighborhood including a plurality of lots 14. In most applications, however, the geographic survey region will preferably include a specific governmental jurisdiction such as a county, township or city. An aerial photograph of the geographic survey region 10 is taken and supplied to the digitizer unit 100 shown in FIG. 5. The digitizer unit 100 converts the aerial photograph to digital image data that is supplied to the GIS 110. Alternatively, a digital imaging system 105 is employed in an aircraft to directly capture a digital image of the geographic survey area which is then supplied to the GIS 110.

The GIS 110 subsequently displays the digital image on a display unit 120 for identification and marking of the fixed ground reference points. For example, an operator reviews the displayed digital image and uses the operator interface device 125 (keyboard, mouse, pen input unit, etc.) to identify or mark each of the fixed ground reference points 12 and enter their known longitude, latitude and elevation. The processing unit 130 correlates the data entered by the operator with the digital image data to generate an image base map for the geographic survey area that is corrected to represent a true planimetric image of the geographic survey area 12, and stores the image base map in the memory unit 115. It should be noted that automatic identification of the fixed reference points 12 can also be utilized in place of manual identification and marking by an operator. For example, in the case of fixed reference points that are physically marked on the ground, the fixed reference points 12 can consist of a specific geometric pattern that is identified by image or character recognition software provided in the processing unit 130. Alternatively, in the case of fixed reference points inserted during image generation, the fixed reference points 12 can consist of a coded pixel(s) that is recognized by the processing unit 130 as a fixed reference point.

Creation of the various legal description maps required for each of the lots 14 located in the geographic survey region 10 is accomplished by having the operator use the operator interface 125 to enter legal description data into the processing unit 130. The operator uses the computer aided drafting capabilities of the GIS 110 to create a legal description map as shown in FIG. 7 that is similar to a conventional survey map of the type shown in FIG. 2. The legal description map is then stored in the memory unit 115.

The creation of a comprehensive survey map for a specific lot can proceed once the image base map and the legal description map for the specific lot have been loaded in the GIS 110. Specifically, a GPS receiver is located at a minimum of three survey points 16 (see FIG. 4) on, near or adjacent to the lot to be surveyed. The GPS receiver uses satellite transmitted radio signals to derive the latitude and longitude coordinates of survey points 16. The position data for the survey points 16 are entered by an operator into the GIS 110, which uses the data to overlay and locate the legal description map for the surveyed lot over a corresponding portion of the image base map. Specifically, the processing unit 130 recalls a portion of the image base map that corresponds to the survey point position data and the legal description map for the surveyed lot. The processing unit 130 sizes, rotates and locates the legal description map (by correlating the survey point position data to data contained in the legal description map relating to boundary points and/or lines) to overlay the appropriate section of the recalled image base map, thereby creating a comprehensive survey map for the surveyed lot. A hard copy of the comprehensive survey map, as illustrated in FIG. 2, is then printed by the printing unit.

The invention has been described with reference to certain preferred embodiments thereof. It will be understood, however, that modifications and variations are possible within the scope of the appended claims. For example, the order in which the process steps are carried out is not critical and can be reversed if desired.

What is claimed is:

1. A process for generating a land survey map comprising the steps of:
    generating digital image data corresponding to an aerial view of a geographic survey region;
    rectifying the digital image data with a processing unit to create a corrected planimetric image base map of the geographic survey region;
    storing the image base map in an image base map database;
    generating a legal description map for at least one parcel of land within the geographic survey region with the processing unit, wherein the legal description map includes property line data corresponding to property lines associated with the parcel of land;
    storing the legal description map in a legal description map database;
    generating position data for at least three survey points with a ground-based remote sensing unit; and
    using the processing unit to retrieve the legal description map from and legal description map database and overlay the legal description map onto a portion of the image base map retrieved from the image base map database to generate a comprehensive survey map for the parcel of land, based on the position data of the survey points generated by the ground-based remote sensing unit.

2. A process for generating a land survey map as claimed in claim 1, wherein the digital image data is generated by taking an aerial photograph of the geographic survey region and digitizing the photograph with a digitizer unit.

3. A process for generating a land survey map as claimed in claim 1, wherein the digital image data is generated by taking an aerial image of the geographic survey region with a digital imaging system.

4. A process for generating a land survey map as claimed in claim 1, wherein the image data includes fixed ground reference points of known position and elevation, and the processing unit performs the rectification of the digital image data based on position and elevation of the fixed ground reference points.

5. A process for generating a land survey map as claimed in claim 1, further comprising the storing of the image base map and the legal description map in a memory unit.

6. A process for generating a land survey map as claimed in claim 1, further comprising the printing of the comprehensive survey map with a printing unit.

7. A process for generating a land survey map as claimed in claim 1, further comprising the transmission of the comprehensive survey map to a remote location with a communications network.

8. A system for generating a land survey map comprising:
    means for generating digital image data corresponding to an aerial view of a geographic survey region;
    means for rectifying the digital image data to create a corrected planimetric image base map of the geographic survey region;
    means for storing the image base mad in an image base map database;
    means for generating a legal description map for at least one parcel of land within the geographic survey region, wherein the legal description map includes property line data corresponding to property lines associated with the parcel of land;
    means for storing the legal description map in a legal description map database;
    ground-based remote sensing means for generating position data for at least three survey points; and
    means for retrieving the legal description map from the legal description map database and overlaying the legal description map onto a portion of the image base map retrieved from the image base map database to generate a comprehensive survey map for the parcel of land based on the position data of the survey points.

9. A system for generating a land survey map as claimed in claim 8, wherein said means for generating said digital image data includes a digitizer unit for digitizing an aerial photograph of the geographic survey region.

10. A system for generating a land survey map as claimed in claim 8, wherein said means for generating said digital image data includes a digital imaging system for taking an aerial image of the geographic survey region.

11. A system for generating a land survey map as claimed in claim 8, wherein said remote sensing means comprises at least one global positioning satellite receiver.

12. A system for generating a land survey map as claimed in claim 8, further comprising means for printing said comprehensive survey map.

13. A system for generating a land survey map as claimed in claim 8, further comprising means for transmitting said comprehensive survey map to a remote location.

* * * * *